United States Patent
Cao

(10) Patent No.: US 11,782,173 B2
(45) Date of Patent: Oct. 10, 2023

(54) RADIATION DETECTOR AND METHODS OF DATA OUTPUT FROM IT

(71) Applicant: SHENZHEN XPECTVISION TECHNOLOGY CO., LTD., Shenzhen (CN)

(72) Inventor: Peiyan Cao, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 768 days.

(21) Appl. No.: 16/742,797

(22) Filed: Jan. 14, 2020

(65) Prior Publication Data
US 2020/0150290 A1    May 14, 2020

Related U.S. Application Data

(63) Continuation of application No. PCT/CN2017/094455, filed on Jul. 26, 2017.

(51) Int. Cl.
*G01T 1/24* (2006.01)

(52) U.S. Cl.
CPC .................... *G01T 1/247* (2013.01)

(58) Field of Classification Search
CPC ........... G01T 1/247; G01T 1/244; H04N 5/32; H04N 5/3742; H04N 5/37455
See application file for complete search history.

(56) References Cited

U.S. PATENT DOCUMENTS

| | | | |
|---|---|---|---|
| 2003/0105397 A1* | 6/2003 | Turner | G01T 1/2985 600/436 |
| 2005/0069073 A1 | 3/2005 | Ogura et al. | |
| 2013/0228693 A1 | 9/2013 | Soh et al. | |
| 2014/0131588 A1 | 5/2014 | Tsukiyama et al. | |
| 2020/0150290 A1* | 5/2020 | Cao | G01T 1/244 |

FOREIGN PATENT DOCUMENTS

| | | |
|---|---|---|
| CN | 1381716 A | 11/2002 |
| CN | 101435874 A | 5/2009 |
| CN | 103632729 A | 3/2014 |
| CN | 104967763 A | 10/2015 |
| CN | 105556949 A | 5/2016 |
| CN | 106104302 A | 11/2016 |
| EP | 2348704 A1 | 7/2011 |
| EP | 2651119 B1 | 2/2017 |
| TW | 201713966 A | 4/2017 |
| WO | 2016161542 A1 | 10/2016 |
| WO | 2016161544 A1 | 10/2016 |

* cited by examiner

*Primary Examiner* — Tony Ko
(74) *Attorney, Agent, or Firm* — IPRO, PLLC; Qian Gu

(57) ABSTRACT

Disclosed herein is an apparatus suitable for detecting radiation, comprising: a plurality of pixels configured to generate an electric signal upon exposure to a radiation; an electronic system configured to read out the electric signal; wherein the electronic system comprises a first memory and a second memory; wherein the first memory is configured to store a plurality of data bits representing the electric signal generated by the pixel that the first memory is associated with; wherein the electronic system is configured to transmit a subset of bits among the plurality of data bits, from the first memory to the second memory; wherein the electronic system is configured to transmit the subset of bits from the second memory to a bus.

40 Claims, 19 Drawing Sheets

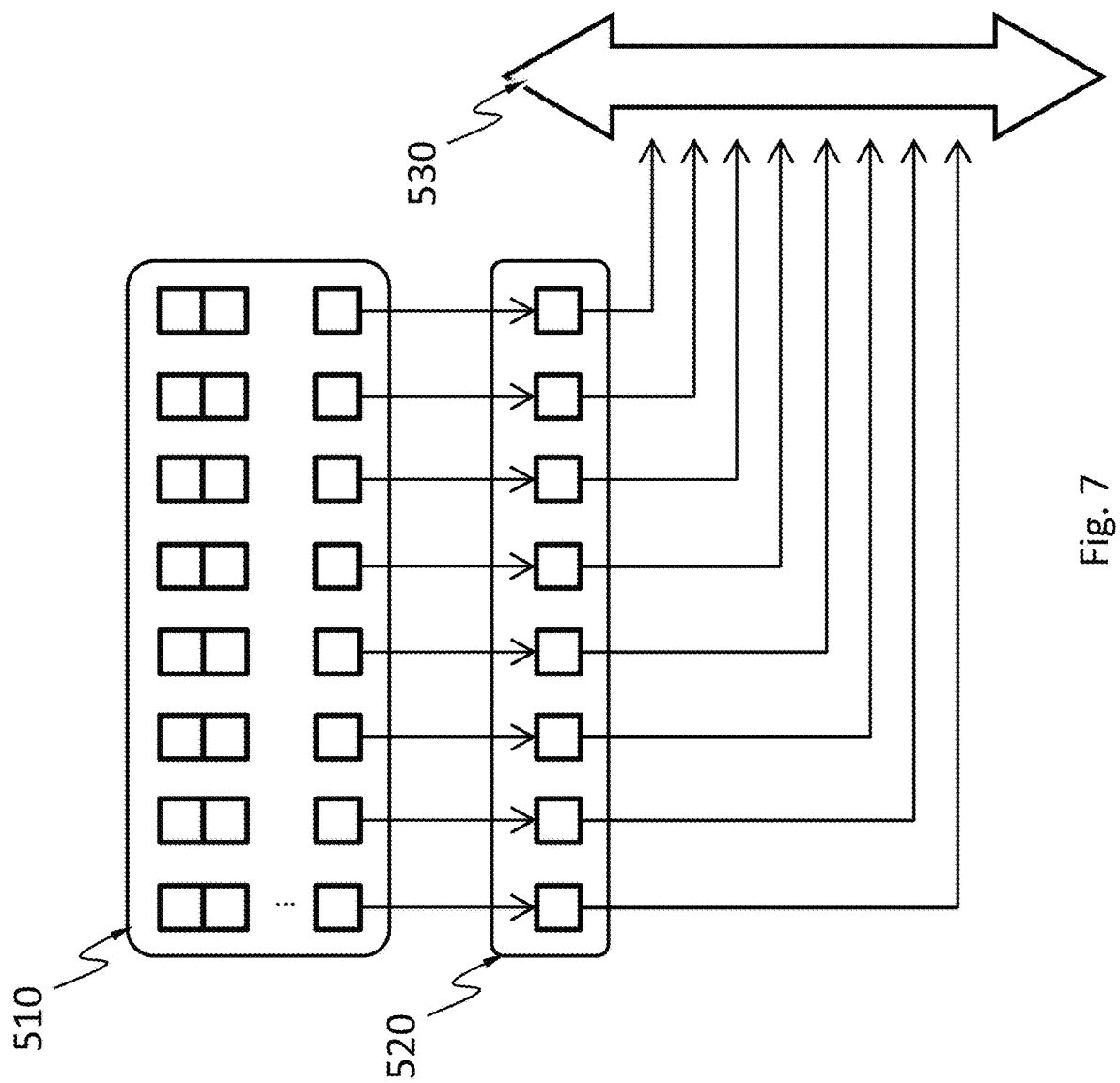

RADIATION DETECTOR AND METHODS OF DATA OUTPUT FROM IT

TECHNICAL FIELD

The disclosure herein relates to an apparatus suitable for detecting radiation, and methods of data output from the apparatus.

BACKGROUND

A radiation detector is a device that measures a property of a radiation. Examples of the property may include a spatial distribution of the intensity, phase, and polarization of the radiation. The radiation may be one that has interacted with a subject. For example, the radiation measured by the radiation detector may be a radiation that has penetrated or reflected from the subject. The radiation may be an electromagnetic radiation such as infrared light, visible light, ultraviolet light, X-ray or γ-ray. The radiation may be of other types such as α-rays and β-rays.

One type of radiation detectors is based on interaction between the radiation and a semiconductor. For example, a radiation detector of this type may comprise a semiconductor layer that absorbs the radiation and then generates charge carriers (e.g., electrons and holes) whose amount is proportional to the energy of the radiation. The charge carriers are collected and counted by an electronic system to determine the energy of the radiation and the process repeats for the next incident radiation. A spectrum may be compiled by counting the number of detected radiation as a function of its energy.

SUMMARY

Disclosed herein is an apparatus suitable for detecting radiation, comprising: a plurality of pixels configured to generate an electric signal upon exposure to a radiation; an electronic system configured to read out the electric signal; wherein the electronic system comprises a first memory and a second memory; wherein the first memory is configured to store a plurality of data bits representing the electric signal generated by the pixel that the first memory is associated with; wherein the electronic system is configured to transmit a subset of bits among the plurality of data bits, from the first memory to the second memory; wherein the electronic system is configured to transmit the subset of bits from the second memory to a bus.

According to an embodiment, a bit width of the second memory is less than a bit width of the first memory.

According to an embodiment, a bit width of the subset of bits is equal or less than a bit width of the second memory.

According to an embodiment, the electronic system is configured to transmit the subset of bits by shifting bit by bit from the first memory, to the second memory, then to the bus.

According to an embodiment, the electronic system is configured to transmit all bits of the subset of bits at the same time from the first memory, to the second memory, then to the bus.

According to an embodiment, the electronic system is configured to transmit the subset of bits without changing a sequential order of the subset of bits.

According to an embodiment, the electronic system is configured to transmit the subset of bits by reversing a sequential order of the subset of bits.

According to an embodiment, the subset of bits are most significant bits (MSBs) among the plurality of data bits.

According to an embodiment, the electronic system is configured to shift least significant bits (LSBs) among the plurality of the data bits into positions of the first subset of bits.

According to an embodiment, the subset of bits are least significant bits (LSBs) among the plurality of data bits.

According to an embodiment, the electronic system is configured to shift most significant bits (MSBs) among the plurality of the data bits into positions of the first subset of bits.

According to an embodiment, the electronic system is configured to verify the subset of bits transmitted to the second memory against contents of the first memory.

According to an embodiment, the electronic system is configured to retransmit the subset of bits from the first memory to the second memory when verification of the subset of bits fails.

According to an embodiment, the electronic system is configured to erase the subset of bits from the first memory when verification of the subset of bits succeeds.

According to an embodiment, the electronic system is configured to verify the subset of bits transmitted to the bus against contents of the second memory.

According to an embodiment, the electronic system is configured to retransmit the subset of bits from the second memory to the bus when verification of the subset of bits fails.

According to an embodiment, the electronic system is configured to erase the subset of bits from the second memory when verification of the subset of bits succeeds.

According to an embodiment, the electronic system further comprises a first voltage comparator configured to compare a voltage of the second electrical contact to a first threshold; a second voltage comparator configured to compare the voltage to a second threshold; a counter configured to register a number of radiation particles absorbed by the radiation absorption layer; a controller, wherein the controller is configured to start a time delay from a time at which the first voltage comparator determines that an absolute value of the voltage equals or exceeds an absolute value of the first threshold; wherein the controller is configured to activate the second voltage comparator during the time delay; wherein the controller is configured to cause the number registered by the counter to increase by one, if the second voltage comparator determines that an absolute value of the voltage equals or exceeds an absolute value of the second threshold.

According to an embodiment, the electronic system further comprises a capacitor module electrically connected to the electrode, wherein the capacitor module is configured to collect charge carriers from the electrode.

According to an embodiment, the controller is configured to connect the electrode to an electrical ground.

According to an embodiment, the controller is configured to deactivate the voltage comparator at a beginning of the time delay.

According to an embodiment, the first threshold is 5-10% of a voltage a single radiation particle generates on the electrode.

According to an embodiment, the radiation absorption layer comprises a diode.

According to an embodiment, the radiation absorption layer comprises silicon, germanium, GaAs, CdTe, CdZnTe, or a combination thereof.

According to an embodiment, the apparatus does not comprise a scintillator.

Disclosed herein is a system comprising any of the radiation detectors above and a radiation source, wherein the system is configured to perform radiation radiography on human chest or abdomen.

Disclosed herein is a system comprising any of the radiation detectors above and a radiation source, wherein the system is configured to perform radiation radiography on human mouth.

Disclosed herein is a cargo scanning or non-intrusive inspection (NII) system comprising any of the radiation detectors above and a radiation source, wherein the cargo scanning or non-intrusive inspection (NII) system is configured to form an image using backscattered radiation.

Disclosed herein is a cargo scanning or non-intrusive inspection (NII) system comprising any of the radiation detectors above and a radiation source, wherein the cargo scanning or non-intrusive inspection (NII) system is configured to form an image using radiation transmitted through an object inspected.

Disclosed herein is a full-body scanner system comprising any of the radiation detectors above and a radiation source.

Disclosed herein is a radiation computed tomography (radiation CT) system comprising any of the radiation detectors and a radiation source.

Disclosed herein is an electron microscope comprising any of the radiation detectors, an electron source and an electronic optical system.

Disclosed herein is a system comprising any of the radiation detectors above, wherein the system is a radiation telescope, or a radiation microscopy, or wherein the system is configured to perform mammography, industrial defect detection, microradiography, casting inspection, weld inspection, or digital subtraction angiography.

Disclosed herein is a method comprising: transmitting a subset of bits among a plurality of data bits stored in a first memory of an electronic system of an apparatus suitable for detecting radiation; from the first memory to a second memory of the electronic system, wherein the plurality of data bits represent an electrical signal generated by a pixel of the apparatus upon exposure to the radiation; transmitting the subset of bits from the second memory to a bus.

According to an embodiment, the method further comprises: a bit width of the second memory is less than a bit width of the first memory; a bit width of the subset of bits is equal to or less than a bit width of the second memory; transmitting the subset of bits from the first memory to the second memory comprises shifting the subset of bits bit by bit; transmitting the subset of bits from the first memory to the second memory comprises shifting all bits of the subset of bits at the same time; the subset of bits are most significant bits (MSBs) among the plurality of the data bits; the subset of bits are least significant bits (LSBs) among the plurality of the data bits.

According to an embodiment, the method further comprises: verifying the subset of bits transmitted to the second memory against contents of the first memory; retransmitting the subset of bits from the first memory to the second memory when verification of the subset of bits fails; verifying the subset of bits transmitted to the bus against contents of the second memory; retransmitting the subset of bits from the second memory to the bus when verification of the subset of bits fails; repeating transmission of the subset of bits when the plurality of all data bits stored in the first memory are transmitted to the bus, via the second memory.

BRIEF DESCRIPTION OF FIGURES

FIG. 7 schematically shows a parallel transmission of the subset of bits between the first memory, the second memory, and the bus, with the same sequential order of bits, according to an embodiment.

DETAILED DESCRIPTION

Figure 1:
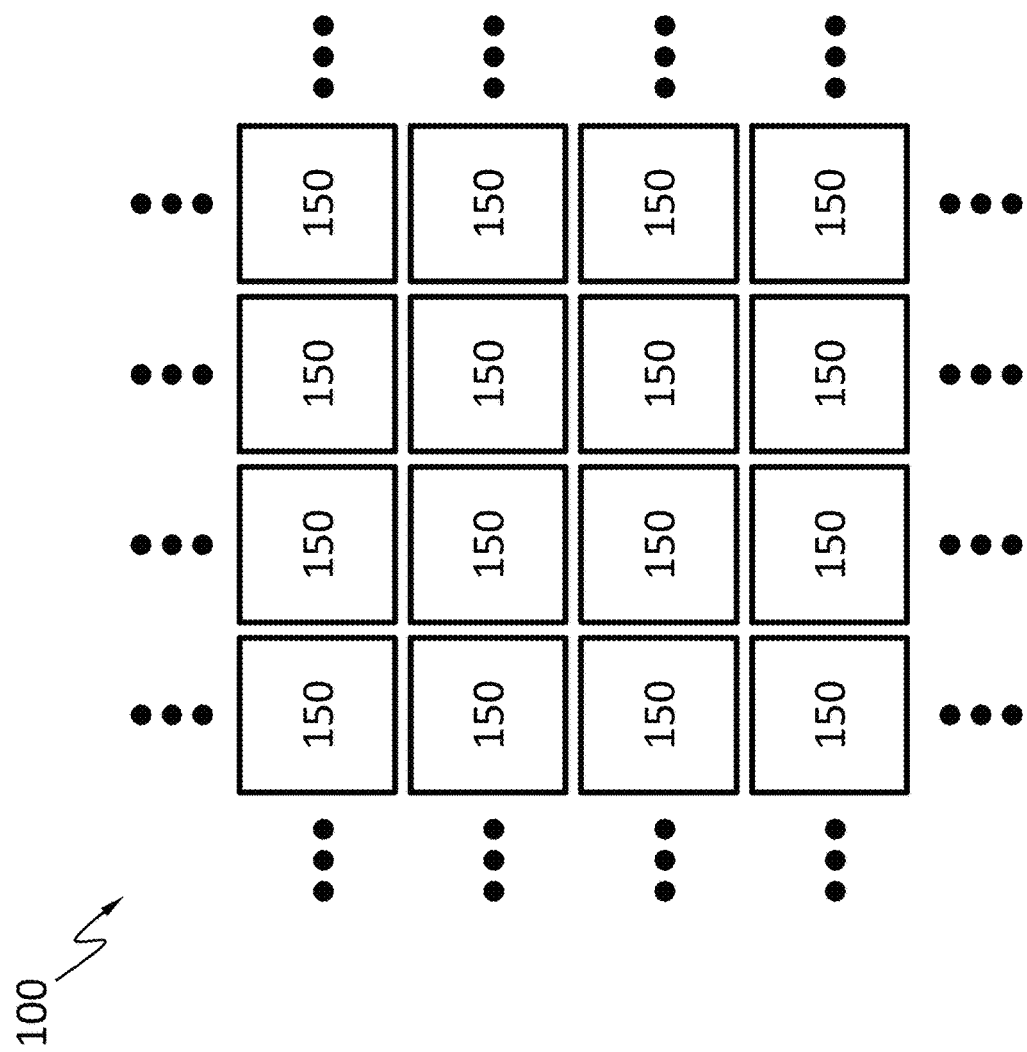
FIG. 1 schematically shows a radiation detector, according to an embodiment.

FIG. 1 schematically shows a radiation detector 100, as an example. The radiation detector 100 has an array of pixels 150. The array may be a rectangular array, a honeycomb array, a hexagonal array or any other suitable array. Each pixel 150 is configured to detect radiation from a radiation source incident thereon and may be configured measure a characteristic (e.g., the energy of the particles, the wavelength, and the frequency) of the radiation. For example, each pixel 150 is configured to count numbers of radiation particles incident thereon whose energy falls in a plurality of bins, within a period of time. All the pixels 150 may be configured to count the numbers of radiation particles incident thereon within a plurality of bins of energy within the same period of time. When the incident radiation particles have similar energy, the pixels 150 may be simply configured to count numbers of radiation particles incident thereon within a period of time, without measuring the energy of the individual radiation particles. Each pixel 150 may have its own analog-to-digital converter (ADC) configured to digitize an analog signal representing the energy of an incident radiation particle into a digital signal, or to digitize an analog signal representing the total energy of a plurality of incident radiation particles into a digital signal. The pixels 150 may be configured to operate in parallel. For example, when one pixel 150 measures an incident radiation particle, another pixel 150 may be waiting for a radiation particle to arrive. The pixels 150 may not have to be individually addressable.

Figure 2A:
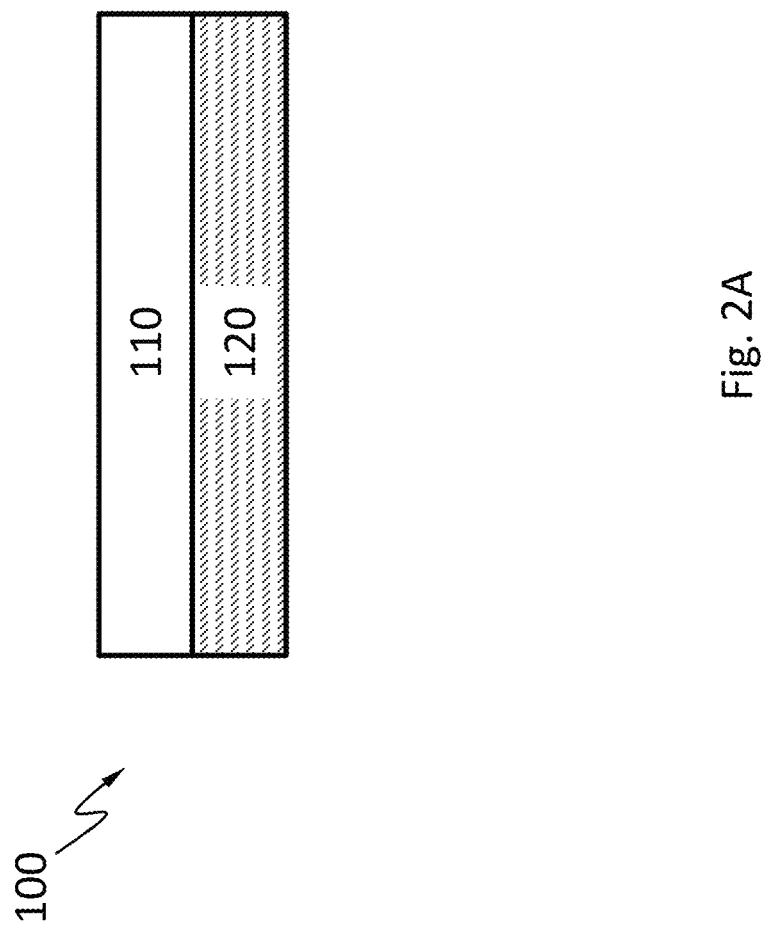
FIG. 2A schematically shows a cross-sectional view of the radiation detector.

FIG. 2A schematically shows a cross-sectional view of the radiation detector 100, according to an embodiment. The radiation detector 100 may include a radiation absorption layer 110 and an electronics layer 120 (e.g., an ASIC) for processing or analyzing electrical signals incident radiation generates in the radiation absorption layer 110. The radiation detector 100 may or may not include a scintillator. The radiation absorption layer 110 may include a semiconductor material such as, silicon, germanium, GaAs, CdTe, CdZnTe, or a combination thereof. The semiconductor may have a high mass attenuation coefficient for the radiation of interest.

Figure 2B:
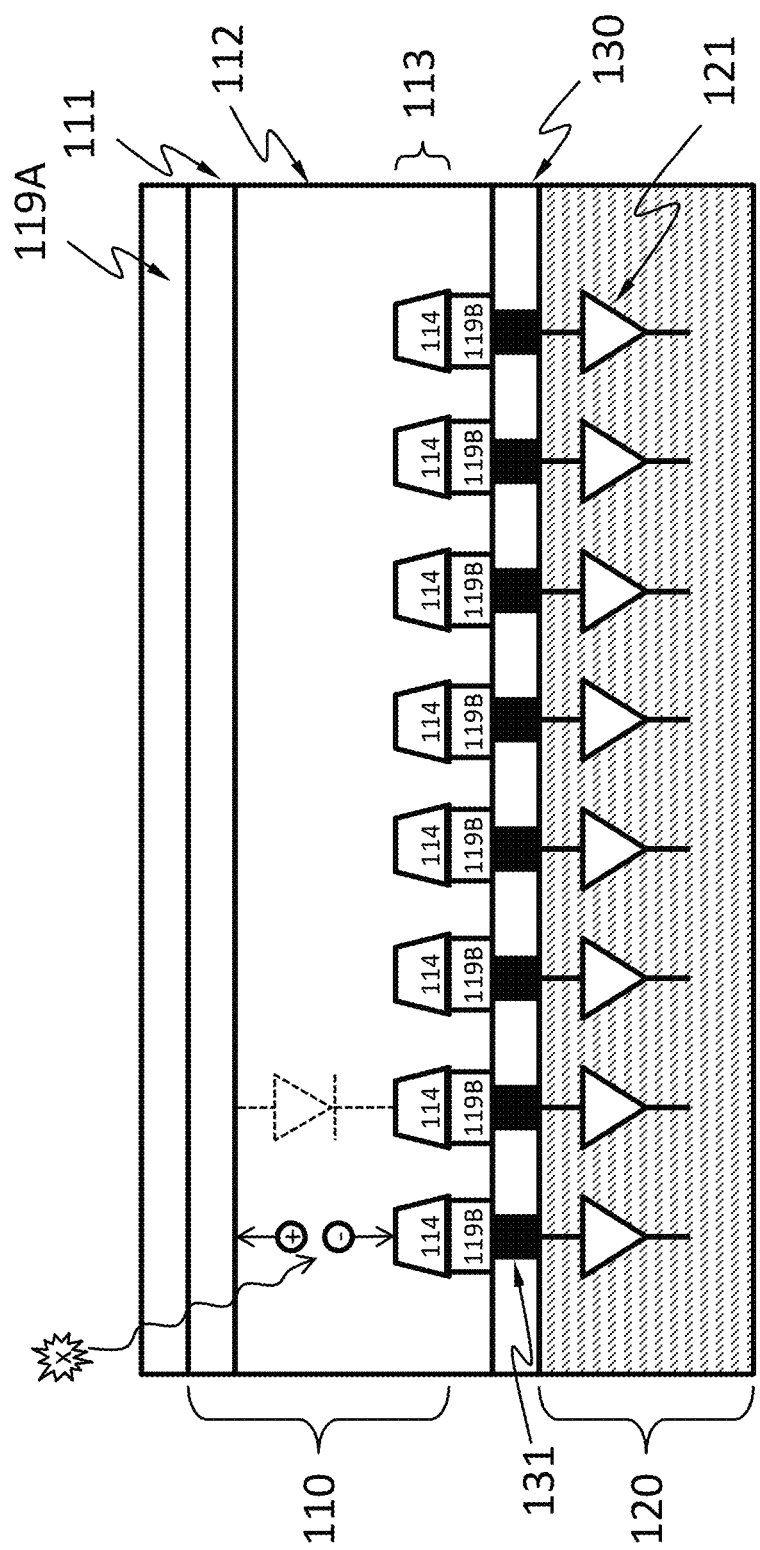
FIG. 2B schematically shows a detailed cross-sectional view of the radiation detector.

As shown in a detailed cross-sectional view of the radiation detector 100 in FIG. 2B, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete portions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes having the first doped region 111 as a shared electrode. The first doped region 111 may also have discrete portions.

When radiation from the radiation source hits the radiation absorption layer 110 including diodes, the radiation particle may be absorbed and generate one or more charge carriers by a number of mechanisms. The charge carriers may drift to the electrodes of one of the diodes under an electric field. The field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel.

Figure 2C:
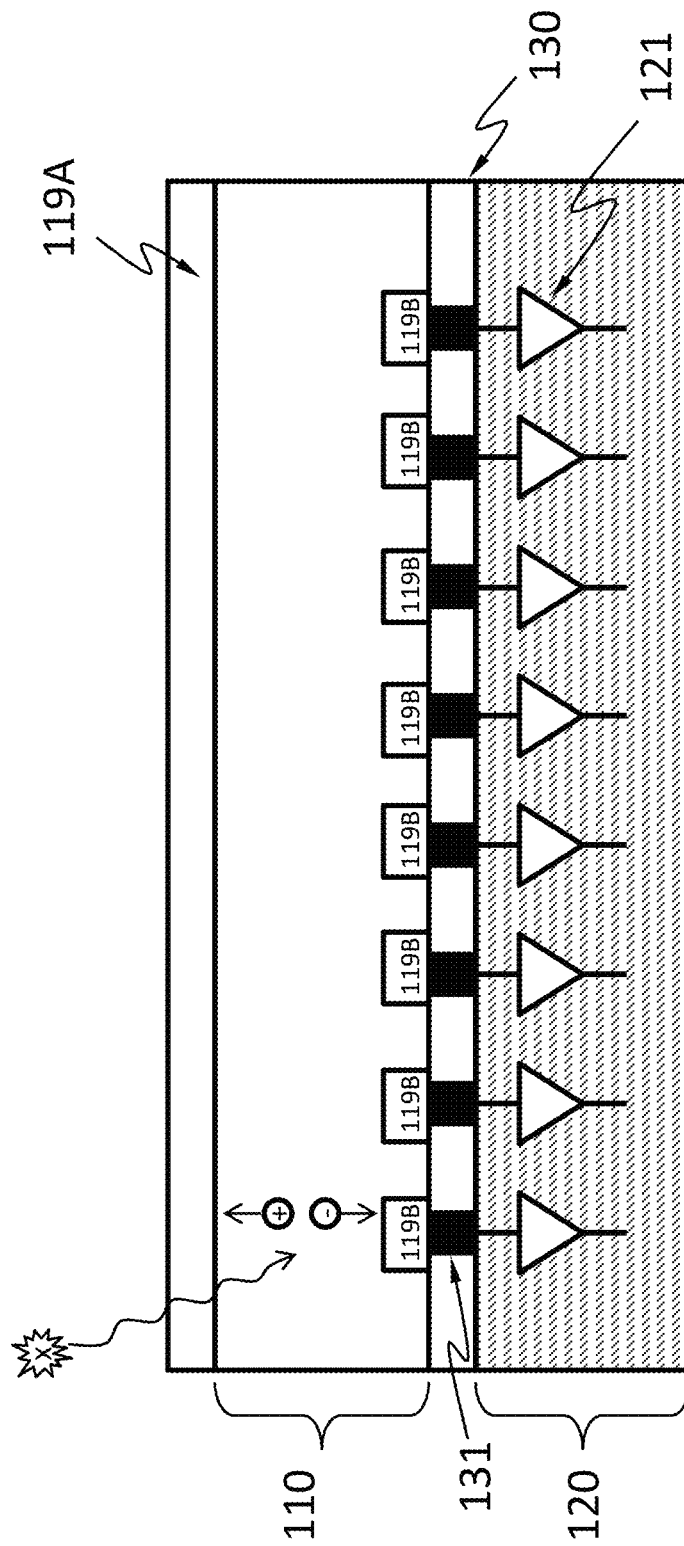
FIG. 2C schematically shows an alternative detailed cross-sectional view of the radiation detector.

As shown in an alternative detailed cross-sectional view of the radiation detector 100 in FIG. 2C, according to an embodiment, the radiation absorption layer 110 may include a resistor of a semiconductor material such as, silicon, germanium, GaAs, CdTe, CdZnTe, or a combination thereof, but does not include a diode. The semiconductor may have a high mass attenuation coefficient for the radiation of interest.

When the radiation hits the radiation absorption layer 110 including a resistor but not diodes, it may be absorbed and generate one or more charge carriers by a number of mechanisms. A particle of the radiation may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and a memory. The electronic system 121 may include one or more ADCs. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the radiation absorption layer 110. Other bonding techniques are possible to connect the electronic system 121 to the pixels without using vias.

Figure 3A:
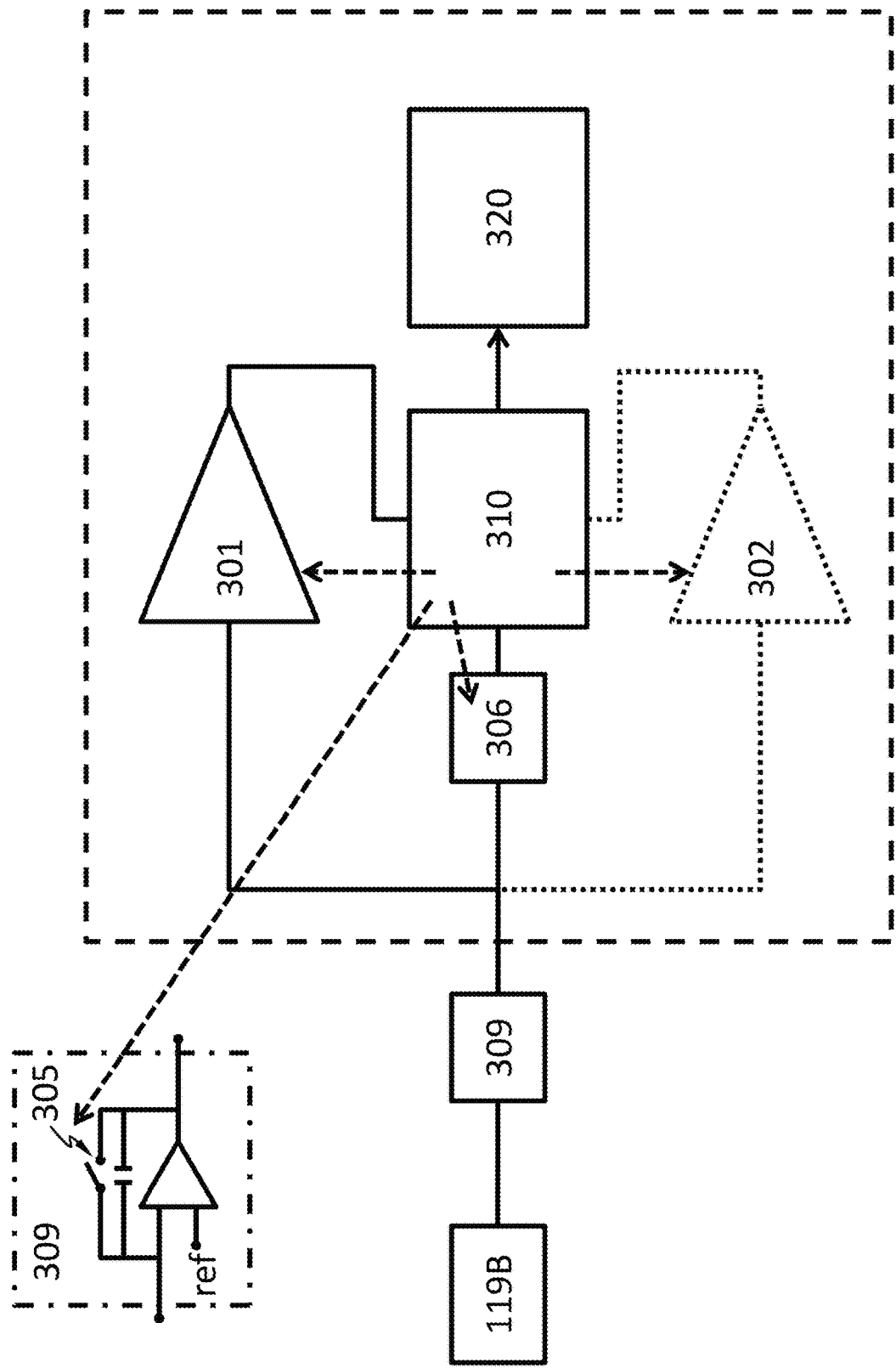
FIG. 3A and FIG. 3B each show a component diagram of an electronic system of the detector in FIG. 2B or FIG. 2C, according to an embodiment.
Figure 3B:
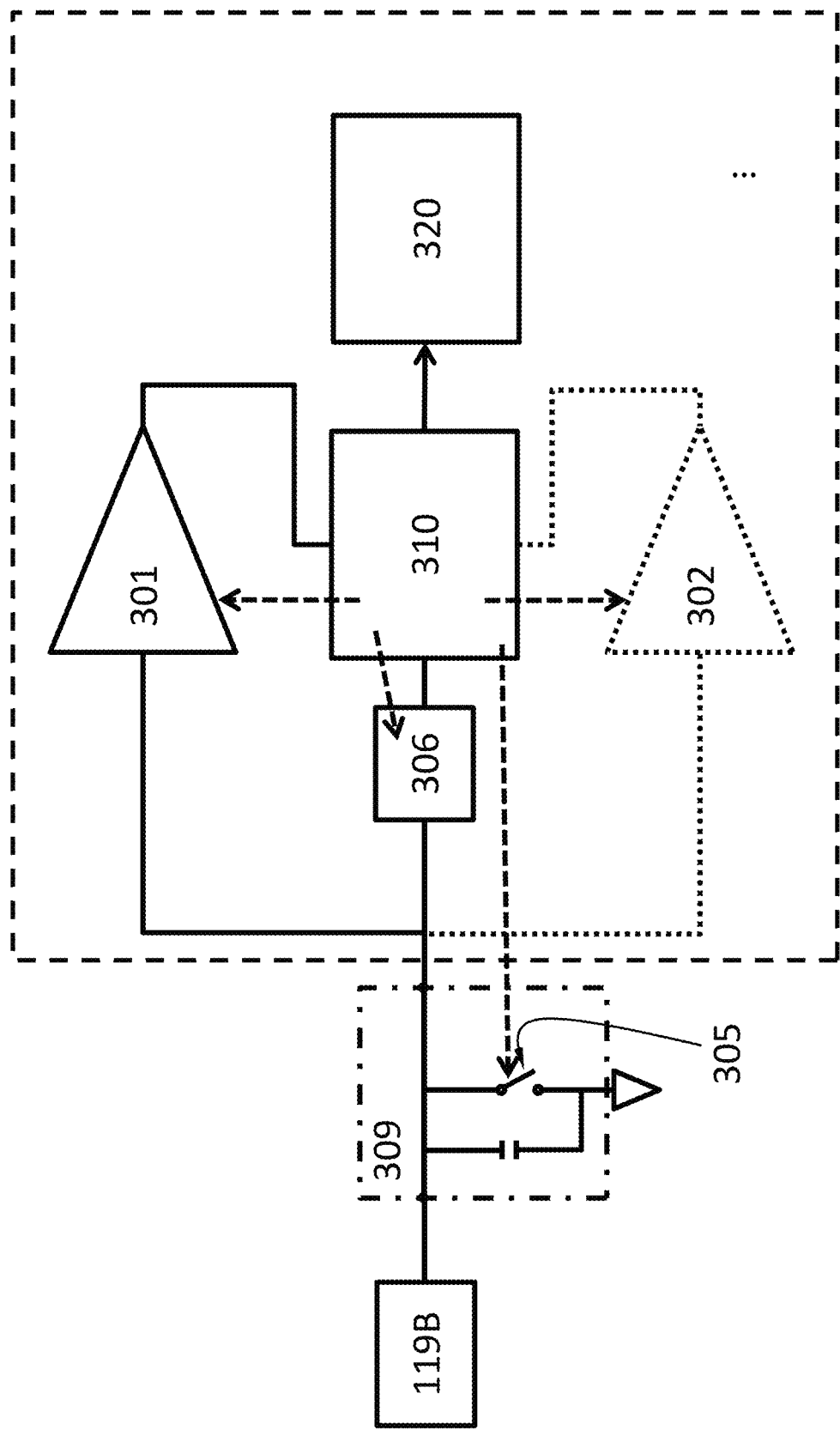

FIG. 3A and FIG. 3B each show a component diagram of the electronic system 121, according to an embodiment. The electronic system 121 may include a voltage comparator 301, a counter 320, a switch 305, a voltmeter 306 and a controller 310.

The voltage comparator 301 is configured to compare the voltage of the electrode of a diode to a first threshold. The diode may be a diode formed by the first doped region 111, one of the discrete regions 114 of the second doped region 113, and the optional intrinsic region 112. Alternatively, the voltage comparator 301 is configured to compare the voltage of an electrical contact (e.g., a discrete portion of electrical contact 119B) to a first threshold. The voltage comparator 301 may be configured to monitor the voltage directly, or calculate the voltage by integrating an electric current flowing through the diode or electrical contact over a period of time. The voltage comparator 301 may be controllably activated or deactivated by the controller 310. The voltage comparator 301 may be a continuous comparator. Namely, the voltage comparator 301 may be configured to be activated continuously, and monitor the voltage continuously. The voltage comparator 301 configured as a continuous comparator reduces the chance that the electronic system 121 misses signals generated by an incident radiation particle. The voltage comparator 301 configured as a continuous comparator is especially suitable when the incident radiation intensity is relatively high. The voltage comparator 301 may be a clocked comparator, which has the benefit of lower power consumption. The voltage comparator 301 configured as a clocked comparator may cause the electronic system 121 to miss signals generated by some incident radiation particles. When the incident radiation intensity is low, the chance of missing an incident radiation particle is low because the time interval between two successive radiation particles is relatively long. Therefore, the voltage comparator 301 configured as a clocked comparator is especially suitable when the incident radiation intensity is relatively low. The first threshold may be 5-10%, 10%-20%, 20-30%, 30-40% or 40-50% of the voltage a single radiation particle may generate on the electrode of the diode or the electrical contact of the resistor. The maximum voltage may depend on the energy of the incident radiation particle, the material of the radiation absorption layer 110, and other factors. For example, the first threshold may be 50 mV, 100 mV, 150 mV, or 200 mV.

The voltage comparator 301 may include one or more op-amps or any other suitable circuitry. The voltage comparator 301 may have a high speed to allow the electronic system 121 to operate under a high flux of incident radiation. However, having a high speed is often at the cost of power consumption.

The counter 320 is configured to register a number of radiation particles reaching the diode or resistor. The counter 320 may be a software component (e.g., a number stored in a computer memory) or a hardware component (e.g., a 4017 IC and a 7490 IC).

The controller 310 may be a hardware component such as a microcontroller and a microprocessor. The controller 310 is configured to start a time delay from a time at which the voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the counter 320 and any other circuits the operation of the voltage comparator 301 does not require, before the time at which the voltage comparator 301 determines that the absolute value of the voltage equals or exceeds the absolute value of the first threshold. The time delay may expire before or after the voltage becomes stable, i.e., the rate of change of the voltage is substantially zero. The phase "the rate of change of the voltage is substantially zero" means that temporal change of the voltage is less than 0.1%/ns. The phase "the rate of change of the voltage is substantially non-zero" means that temporal change of the voltage is at least 0.1%/ns.

The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the voltage comparator 301 activates the controller 310 when the absolute value of the voltage equals or exceeds the absolute value of the first threshold.

The controller 310 may be configured to cause the voltmeter 306 to measure the voltage upon expiration of the time delay. The controller 310 may be configured to connect the electrode or the electrical contact to an electrical ground, so as to reset the voltage and discharge any charge carriers accumulated on the electrode or the electrical contact. In an embodiment, the electrode or the electrical contact is connected to an electrical ground after the expiration of the time delay. In an embodiment, the electrode or the electrical contact is connected to an electrical ground for a finite reset time period. The controller 310 may connect the electrode or the electrical contact to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The voltmeter 306 may feed the voltage it measures to the controller 310 as an analog or digital signal.

Figure 4:
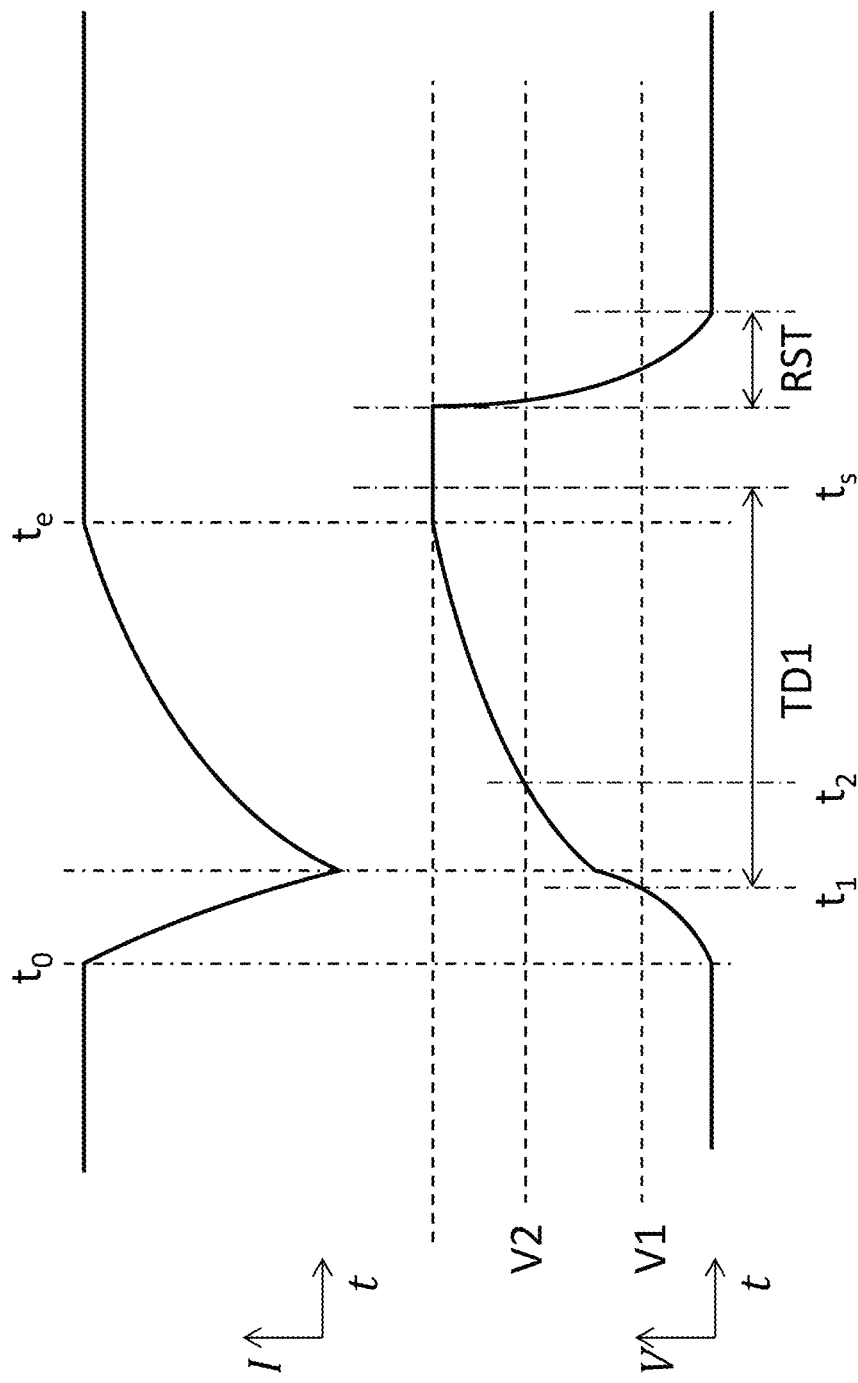
FIG. 4 schematically shows a temporal change of the voltage of the electrode or the electrical contact, caused by charge carriers generated by one or more radiation particles incident on the diode or the resistor, according to an embodiment.

The electronic system 121 may include a capacitor module 309 electrically connected to the electrode of the diode or the electrical contact, wherein the capacitor module is configured to collect charge carriers from the electrode or the electrical contact). The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode or the electrical contact accumulate on the capacitor over a period of time ("integration period") (e.g., as shown in FIG. 4, between $t_0$ to $t_1$). After the integration period has expired, the capacitor voltage is sampled and then reset by a reset switch. The capacitor module can include a capacitor directly connected to the electrode or the electrical contact.

FIG. 4 schematically shows a temporal change of the electric current flowing through the electrode (upper curve) caused by charge carriers generated by a radiation particle incident on the diode or the resistor, and a corresponding temporal change of the voltage of the electrode (lower curve). The voltage may be an integral of the electric current with respect to time. At time to, the radiation particle hits the diode or the resistor, charge carriers start being generated in the diode or the resistor, electric current starts to flow through the electrode of the diode or the resistor, and the absolute value of the voltage of the electrode or electrical contact starts to increase. At time $t_1$, the voltage comparator 301 determines that the absolute value of the voltage equals or exceeds the absolute value of the first threshold V1, and the controller 310 starts the time delay TD1 and the controller 310 may deactivate the voltage comparator 301 at the beginning of TD1. If the controller 310 is deactivated before $t_1$, the controller 310 is activated at $t_1$. During TD1, the controller 310 activates a second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold V2 at time $t_2$, the controller 310 causes the number registered by the counter 320 to increase by one. At time $t_e$, all charge carriers generated by the radiation particle drift out of the radiation absorption layer 110. At time $t_s$, the time delay TD1 expires. In the example of FIG. 4, time $t_s$ is after time $t_e$; namely TD1 expires after all charge carriers generated by the radiation particle drift out of the radiation absorption layer 110. The rate of change of the voltage is thus substantially zero at $t_s$. The controller 310 may be configured to deactivate the second voltage comparator 302 at expiration of TD1 or at $t_2$, or any time in between.

The controller 310 may be configured to cause the voltmeter 306 to measure the voltage upon expiration of the time delay TD1. The voltage Vt measured by the voltmeter 306 is proportional to the amount of charge carriers generated by the incident radiation particles from $t_0$ to $t_s$, which relates to the total energy of the incident radiation particles. When the incident radiation particles have similar energy, the controller 310 may be configured to determine the number of incident radiation particles from $t_0$ to $t_s$, by dividing Vt with the voltage that a single radiation particle would cause on the electrode or electrical contact. The controller 310 may increase the counter 320 by the number of radiation particles.

After TD1 expires, the controller 310 connects the electrode or the electrical contact to an electric ground for a reset period RST to allow charge carriers accumulated on the electrode or the electrical contact to flow to the ground and reset the voltage. After RST, the electronic system 121 is ready to detect another incident radiation particle. Implicitly, the rate of incident radiation particles the electronic system 121 can handle in the example of FIG. 4 is limited by 1/(TD1+RST). If the voltage comparator 301 has been deactivated, the controller 310 can activate it at any time before RST expires. If the controller 310 has been deactivated, it may be activated before RST expires.

Figure 5:
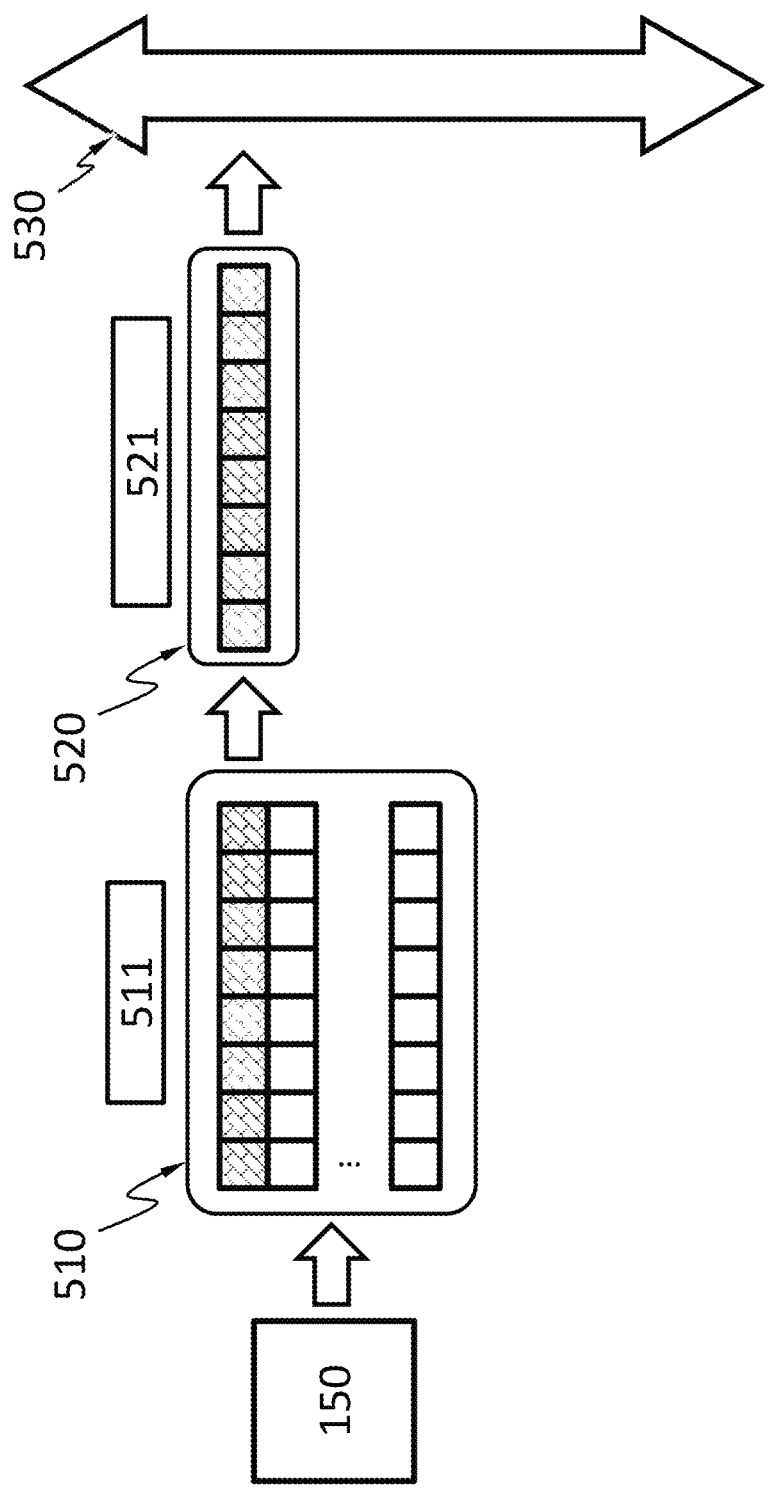
FIG. 5 schematically shows a function block diagram of transmission of a subset of bits between a first memory, a second memory, and a bus, according to an embodiment.

Signals from the pixels of the radiation detector 100 may be read out in a variety of ways. FIG. 5 schematically shows that the electronic system 121 may have a first memory 510 associated with a pixel 150 of the radiation detector 100, and a second memory 520 associated with a pixel 150, according to an embodiment. The first memory 510 is configured to store a plurality of data bits representing the electric signal generated by the pixel 150. For example, the electric signal may be the count number and energy level information of the radiation particles detected by the pixel during the integration period. The first memory 510 may be volatile memory, such RAM, or non-volatile memory, such as Flash memory. The first memory 510 may have 8, 16, 32, 64, or 128 addressable bits. The electronic system 121 may read or write the contents of the memory 151, e.g., using a first memory control module 511. For example, the electronic system 121 may update the contents of the first memory 511 as the number registered by the counter 320 changes. Alternatively, the electronic system 121 may update the contents of the first memory 510 only at the end of the integration period.

Figure 6A:
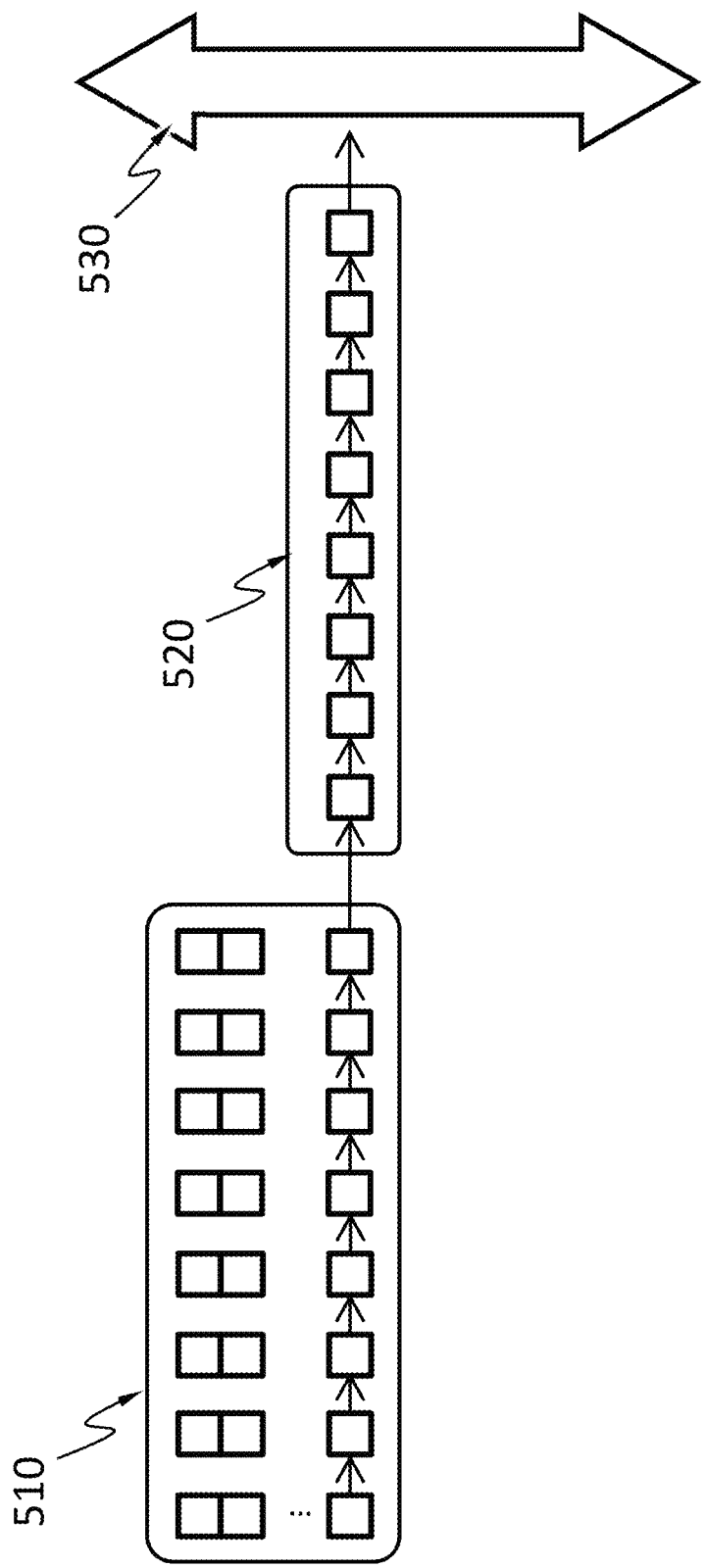
FIG. 6A schematically shows a serial transmission of the subset of bits between the first memory, the second memory, and the bus, with the same sequential order of bits, according to an embodiment.
Figure 6B:
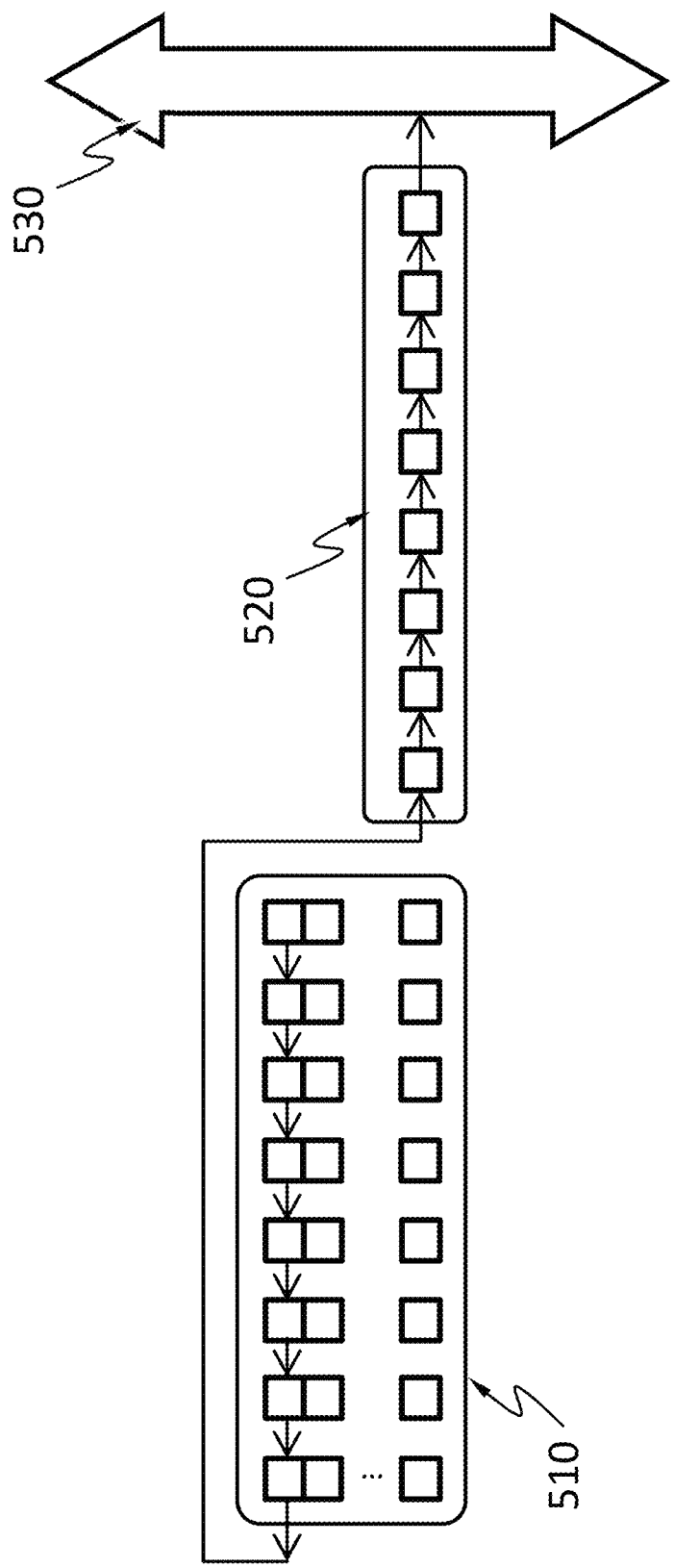
FIG. 6B schematically shows a serial transmission of the subset of bits between the first memory, the second memory, and the bus, with the reversed sequential order of bits, according to an embodiment.

The electronic system 121 may transmit the data bits stored in the first memory 510 to a bus 530, via the second memory 520, according to an embodiment. The second memory 520 may be volatile memory, such as Random-access memory (RAM), or digital registers. The second memory 520 may have less bit width than the bit width of the first memory 510. The term "bit width" of a memory is the number of addressable bits of that memory. The electronic system 121 may transmit a subset of bits among the data bits stored in the first memory to the second memory, for example, using a second memory control module 521. The bit width of the subset of bits may be equal to or less than the bit width of the second memory 520. The subset of bits may be read from a first address, which may be at the beginning, at the end, or in the middle of the first memory 510, for example, as shown in FIG. 6A, and FIG. 6B. The subset of bits may be consecutive in the first memory 510 but not necessarily so.

According to an embodiment, the subset of bits may be read from the most significant bits (MSBs) among the plurality of the bits of the first memory. After reading the first subset of bits, the electronic system 121 may shift the least significant bits (LSBs) among the plurality of bits to the addresses of the subset of bits of the first memory. According to an embodiment, the subset of bits may be read from the least significant bits (LSBs) among the plurality of the bits of the first memory. After reading the first subset of bits, the electronic system 121 may shift the most significant bits (MSBs) among the plurality of bits to the addresses of the subset of bits of the first memory. The electronic system 121 may verify the subset of bits transmitted to the second memory 520 against the contents of the first memory 510, for example, using the second memory control module 521. If the verification fails, the electronic system 121 may re-read the subset again from the first memory 510 and rewrite the subset to the second memory 520. This transmission may be repeated until the subset of bits written into the second memory 520 matches the subset of bits read from the first memory 510. After the verification succeeds, the subset of bits stored at the first address of the first memory 510 may be erased, for example, by the first memory control module 511. After the verification succeeds, the electronic system 121 may further transmit, and optionally verify, the subset of bits transmitted to the second memory 520 to a bus 530. If the subset of bits transmitted to the bus 530 is verified, the contents of the second memory 520 may be erased and the second memory 520 may be ready to receive a new subset of bits from a second address of the first memory 510. The process may repeat until all the data bits stored in the first memory 510 have been transmitted to the bus 530.

Different transmission mechanisms between the first memory 510, the second memory 520 and the bus 530 such as those shown in FIG. 6A, FIG. 6B and FIG. 7, may be used. FIG. 6A, FIG. 6B show serial data transmission mechanisms, according to an embodiment. In the diagram of FIG. 6A, the subset of bits is transmitted without changing the sequential order of the bits of the subset. For example, the subset of bits may be shifted bit by bit in the same direction. In the diagram of FIG. 6B, the subset of bits is transmitted by reversing the sequential order of the bits of the subset, according to an embodiment. For example, the sequential order of the bits in subset may be reversed by shifting bit by bit in opposite directions in the first memory 510 and the second memory 520; e.g., the least significant bit ("LSB") of the subset in the first memory 510 may be shifted towards the most significant bit ("MSB") of the second memory 520. The subset of bits received in the bus 530 may be in different order than the subset of bits read from the first memory 510.

FIG. 7 shows a parallel data transmission mechanism, according to an embodiment. In the parallel transmission, all the bits of the subset data may be read from the beginning, from the middle, or from the end of the first memory 510, at the same time, i.e., in parallel. All the bits of the subset may be parallelly transmitted to the second memory 520. All the bits of the subset data may be transmitted to the bus 530 in parallel. In FIG. 7, the sequential order of the bits of the subset may be the same after transmission. The bit sequential order may be different by transmitting the MSBs of the subset of bits in the first memory to the LSBs of the second memory. The mentioned bit transmission mechanisms may be implemented by the memory control modules, such as 511 and 521. One or more mechanisms may be used during the data transmission.

Figure 8:
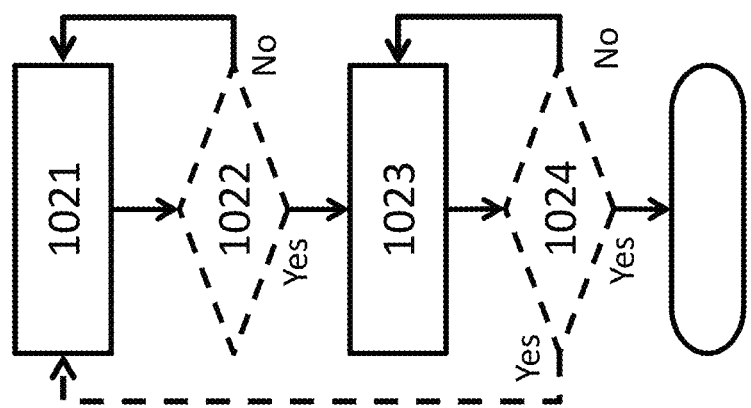
FIG. 8 shows a flow chart for a method suitable for detecting radiation using a system such as the electronic system operating as shown in FIG. 4, and for reading out data as shown in FIG. 6 and FIG. 7, according to an embodiment.

FIG. 8 shows a flow chart for a method of transmitting a subset of bits among a plurality of data bits stored in the first memory 510 of the electronic system 121 of the radiation detector 100, wherein the plurality of data bits represent the electrical signal generated by a pixel of the radiation detector 100 upon exposure to the radiation.

In step 1021, a subset of bits among the plurality of bits stored in the first memory 510 is transmitted to the second memory 520. In optional step 1022, the subset of bits transmitted to the second memory 520 is verified against contents of the first memory 510, e.g., using first memory control module 511. If the verification fails (i.e., the subset of bits transmitted to the second memory 520 does not match the contents of the first memory 510), the method repeats step 1021; namely, the subset of bits is retransmitted from the first memory 510 to the second memory 520. If the verification succeeds (i.e., the subset of bits transmitted to the second memory 520 matches the contents of the first memory 510), the method continues to step 1023. In step 1023, the subset of bits is transmitted from the second memory 520 to the bus 530. In optional step 1024, the subset of bits transmitted to the bus 530 is verified against contents of the second memory 520, e.g., using second memory control module 521. If the verification fails (i.e., the subset of bits transmitted to the bus 530 does not match the contents of the second memory 520), the method repeats step 1023; namely, the subset of bits is retransmitted from the second memory 520 to the bus 530. If the verification succeeds (i.e., the subset of bits transmitted to the bus 530 matches the contents of the second memory 520), the method ends or goes back to step 1021.

Figure 9:
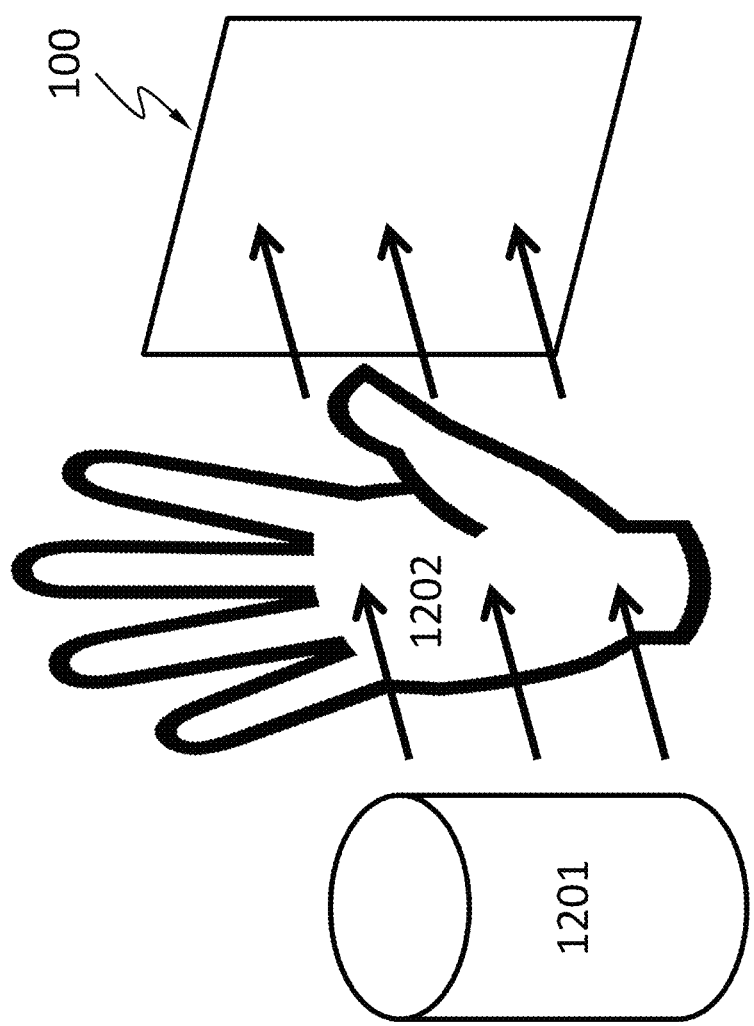
FIG. 9 schematically shows a system comprising the radiation detector described herein, suitable for medical imaging such as chest radiation radiography, abdominal radiation radiography, etc., according to an embodiment FIG. 10 schematically shows a system comprising the radiation detector described herein suitable for dental radiation radiography, according to an embodiment.

FIG. 9 schematically shows a system comprising the radiation detector 100 described herein. The system may be used for medical imaging such as chest Radiation radiography, abdominal radiation radiography, etc. The system comprises a radiation source 1201. radiation emitted from the radiation source 1201 penetrates an object 1202 (e.g., a human body part such as chest, limb, abdomen), is attenuated by different degrees by the internal structures of the object 1202 (e.g., bones, muscle, fat and organs, etc.), and is projected to the radiation detector 100. The radiation detector 100 forms an image by detecting the intensity distribution of the radiation.

Figure 10:
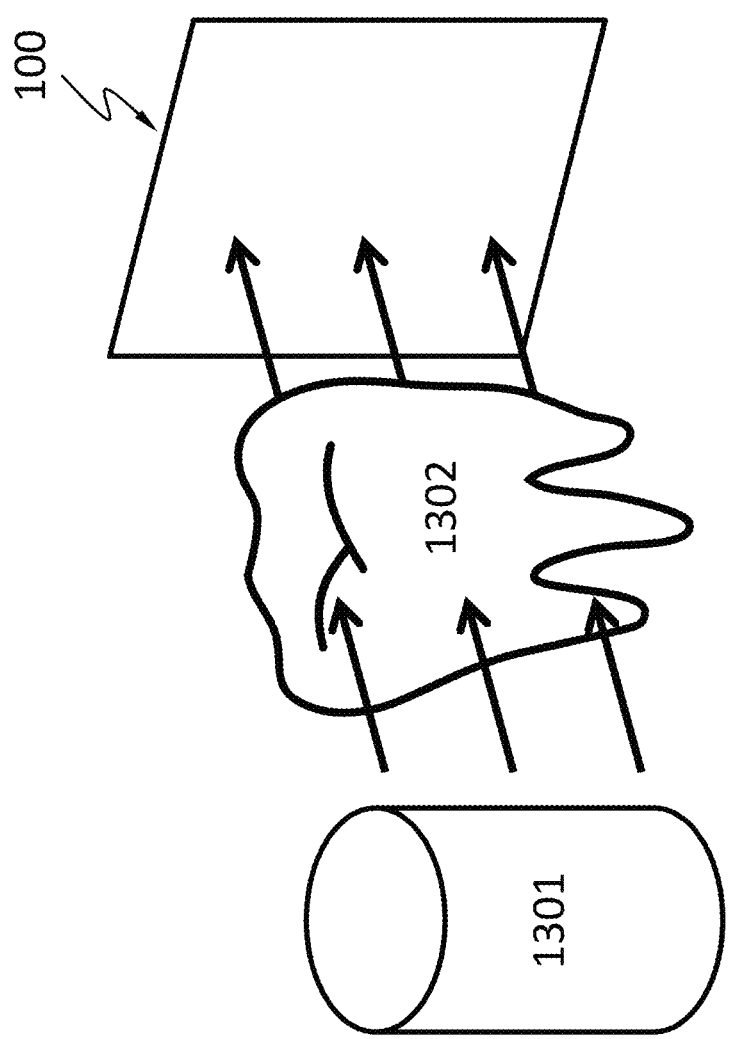

FIG. 10 schematically shows a system comprising the radiation detector 100 described herein. The system may be used for medical imaging such as dental radiation radiography. The system comprises a radiation source 1301. radiation emitted from the radiation source 1301 penetrates an object 1302 that is part of a mammal (e.g., human) mouth. The object 1302 may include a maxilla bone, a palate bone, a tooth, the mandible, or the tongue. The radiation is attenuated by different degrees by the different structures of the object 1302 and is projected to the radiation detector 100. The radiation detector 100 forms an image by detecting the intensity distribution of the radiation. Teeth absorb radiation more than dental caries, infections, periodontal ligament. The dosage of radiation received by a dental patient is typically small (around 0.150 mSv for a full mouth series).

Figure 11:
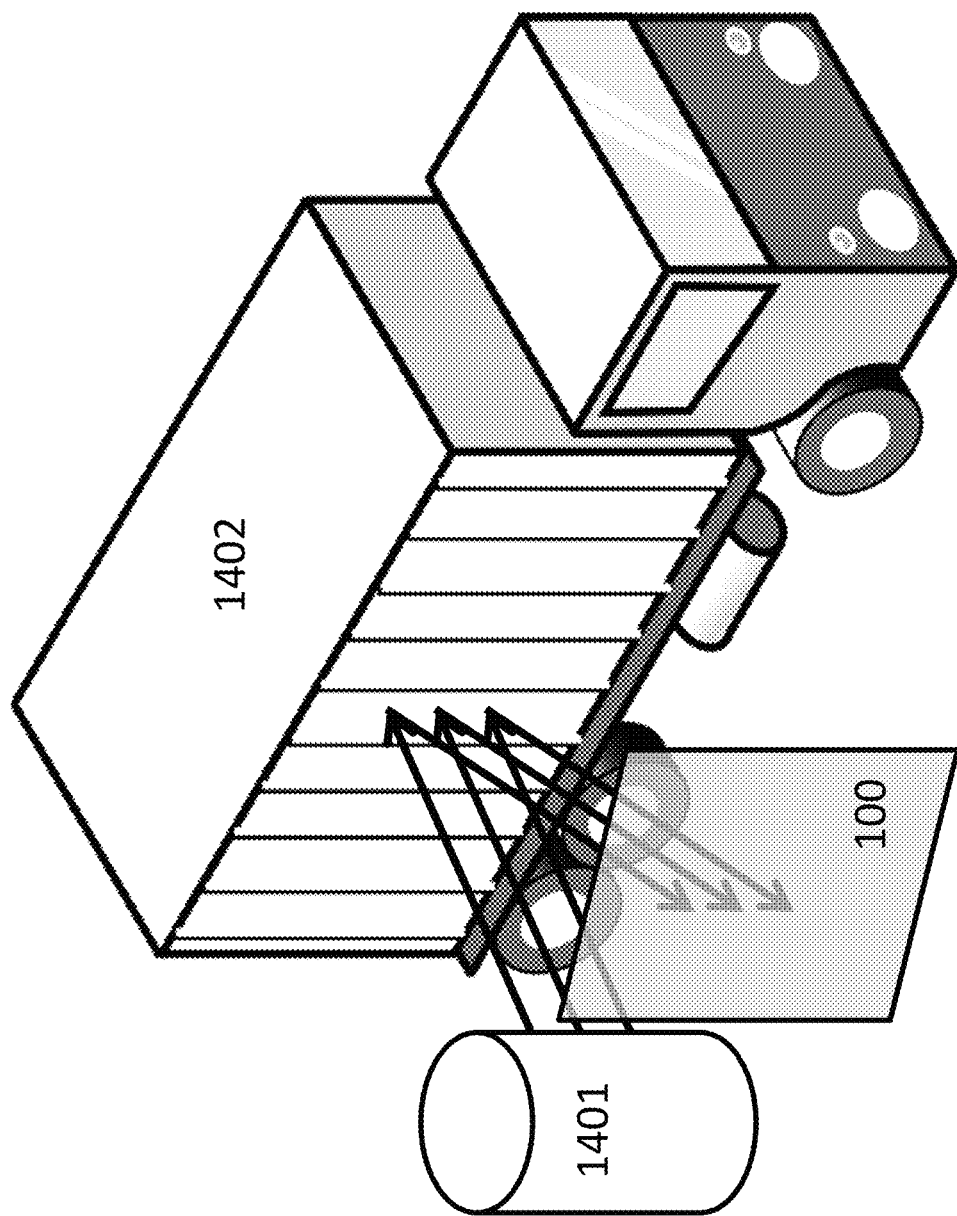
FIG. 11 schematically shows a cargo scanning or non-intrusive inspection (NII) system comprising the radiation detector described herein, according to an embodiment.

FIG. 11 schematically shows a cargo scanning or non-intrusive inspection (NII) system comprising the radiation detector 100 described herein. The system may be used for inspecting and identifying goods in transportation systems such as shipping containers, vehicles, ships, luggage, etc. The system comprises a radiation source 1401. radiation emitted from the radiation source 1401 may backscatter from an object 1402 (e.g., shipping containers, vehicles, ships, etc.) and be projected to the radiation detector 100. Different internal structures of the object 1402 may backscatter radiation differently. The radiation detector 100 forms an image by detecting the intensity distribution of the backscattered radiation and/or energies of the backscattered radiation particles.

Figure 12:
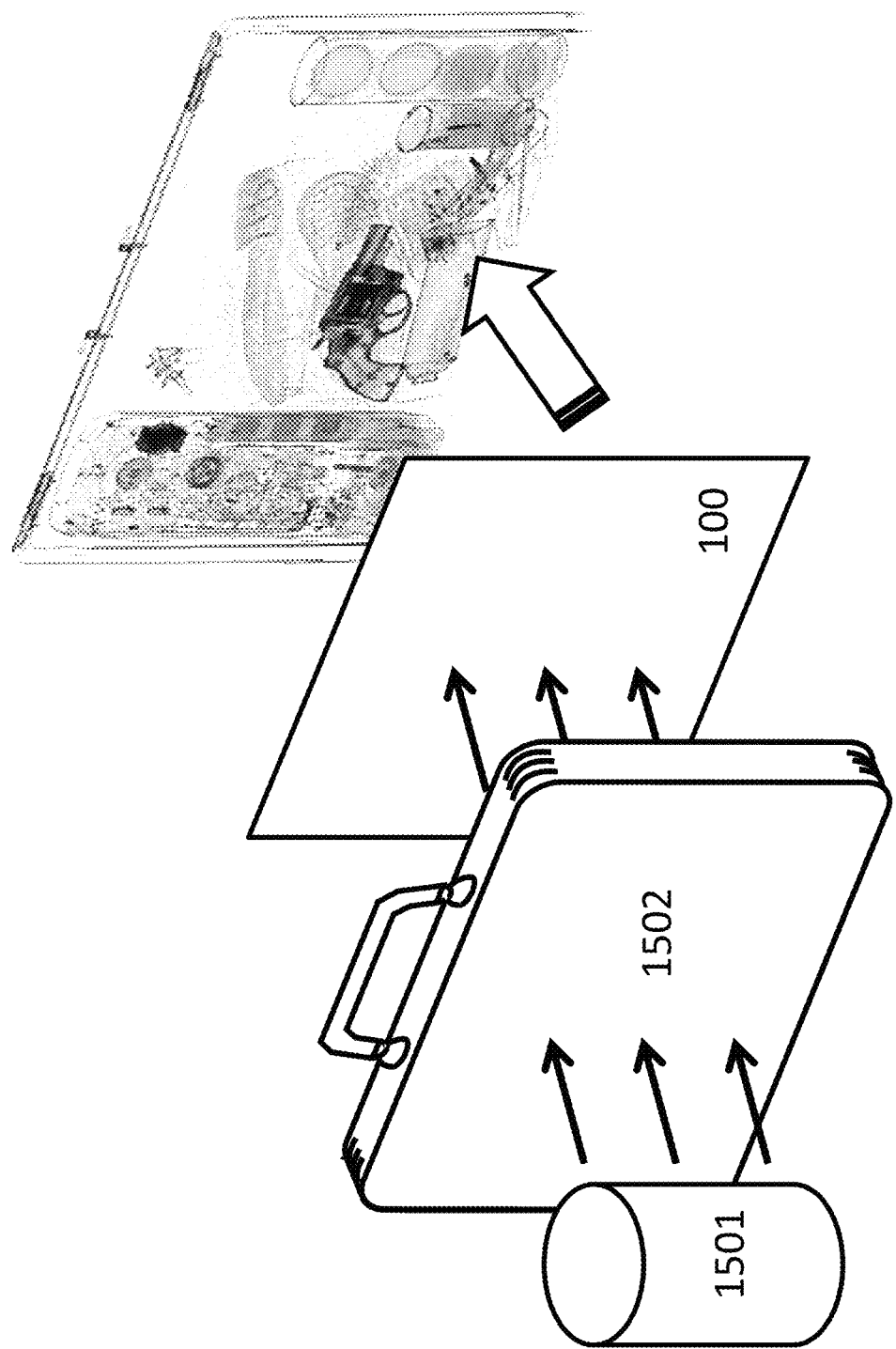
FIG. 12 schematically shows another cargo scanning or non-intrusive inspection (NII) system comprising the radiation detector described herein, according to an embodiment.

FIG. 12 schematically shows another cargo scanning or non-intrusive inspection (NII) system comprising the radiation detector 100 described herein. The system may be used for luggage screening at public transportation stations and airports. The system comprises a radiation source 1501. Radiation emitted from the radiation source 1501 may penetrate a piece of luggage 1502, be differently attenuated by the contents of the luggage, and projected to the radiation detector 100. The radiation detector 100 forms an image by detecting the intensity distribution of the transmitted radiation. The system may reveal contents of luggage and identify items forbidden on public transportation, such as firearms, narcotics, edged weapons, flammables.

Figure 13:
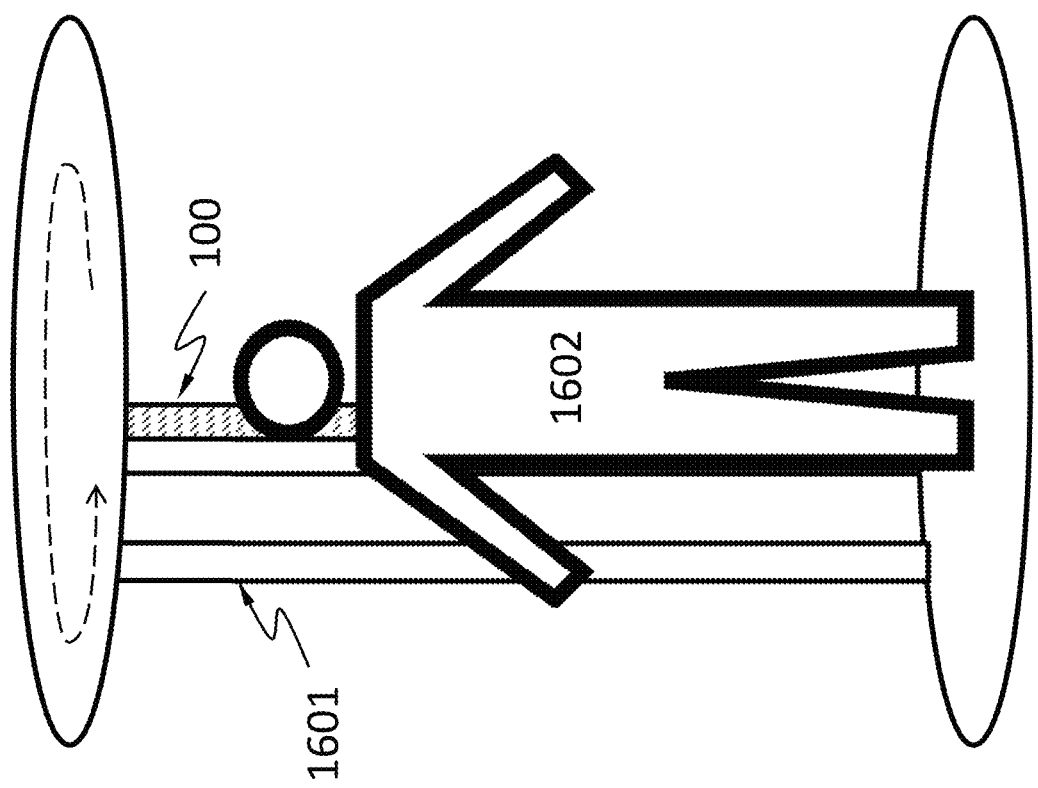
FIG. 13 schematically shows a full-body scanner system comprising the radiation detector described herein, according to an embodiment.

FIG. 13 schematically shows a full-body scanner system comprising the radiation detector 100 described herein. The full-body scanner system may detect objects on a person's body for security screening purposes, without physically removing clothes or making physical contact. The full-body scanner system may be able to detect non-metal objects. The full-body scanner system comprises a radiation source 1601. Radiation emitted from the radiation source 1601 may backscatter from a human 1602 being screened and objects thereon, and be projected to the radiation detector 100. The objects and the human body may backscatter radiation differently. The radiation detector 100 forms an image by detecting the intensity distribution of the backscattered radiation. The radiation detector 100 and the radiation source 1601 may be configured to scan the human in a linear or rotational direction.

Figure 14:
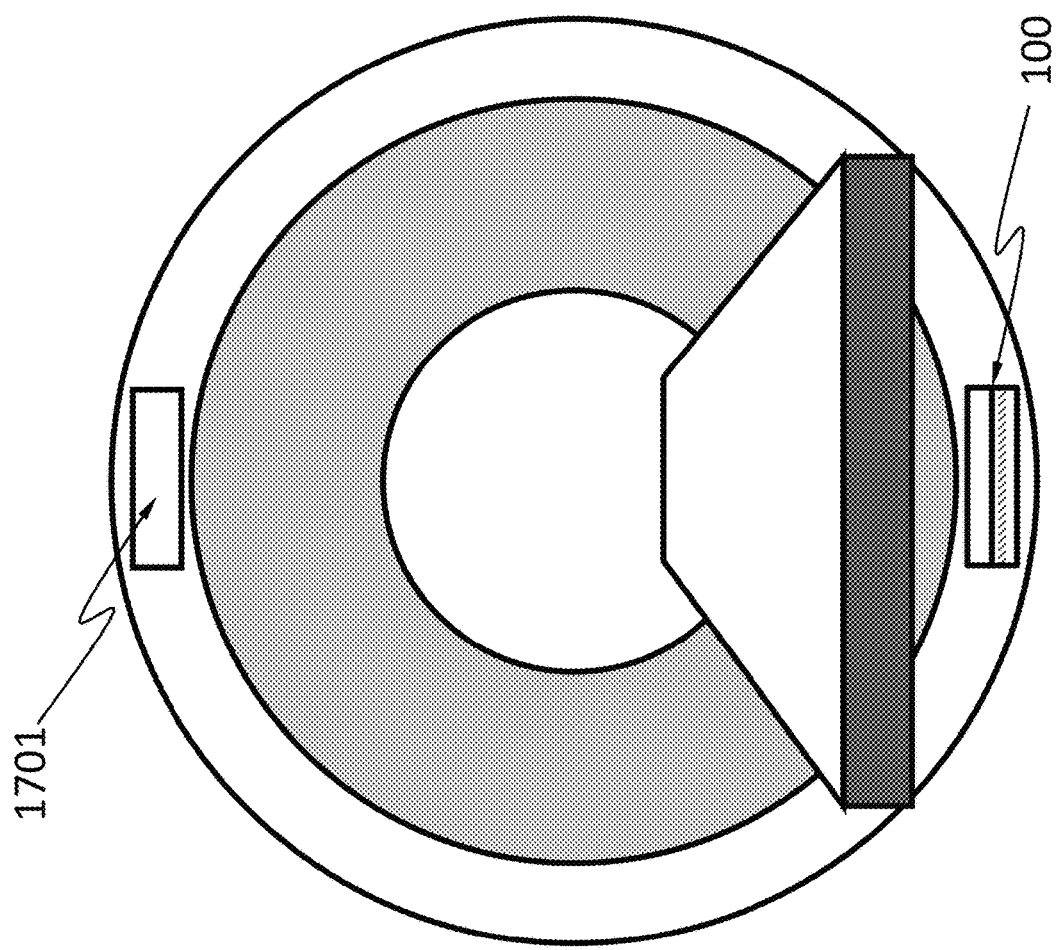
FIG. 14 schematically shows a radiation computed tomography (X-ray CT) system comprising the radiation detector described herein, according to an embodiment.

FIG. 14 schematically shows a radiation computed tomography (radiation CT) system. The radiation CT system uses computer-processed radiation to produce tomographic images (virtual "slices") of specific areas of a scanned object. The tomographic images may be used for diagnostic and therapeutic purposes in various medical disciplines, or for flaw detection, failure analysis, metrology, assembly analysis and reverse engineering. The radiation CT system comprises the radiation detector 100 described herein and a radiation source 1701. The radiation detector 100 and the radiation source 1701 may be configured to rotate synchronously along one or more circular or spiral paths.

Figure 15:
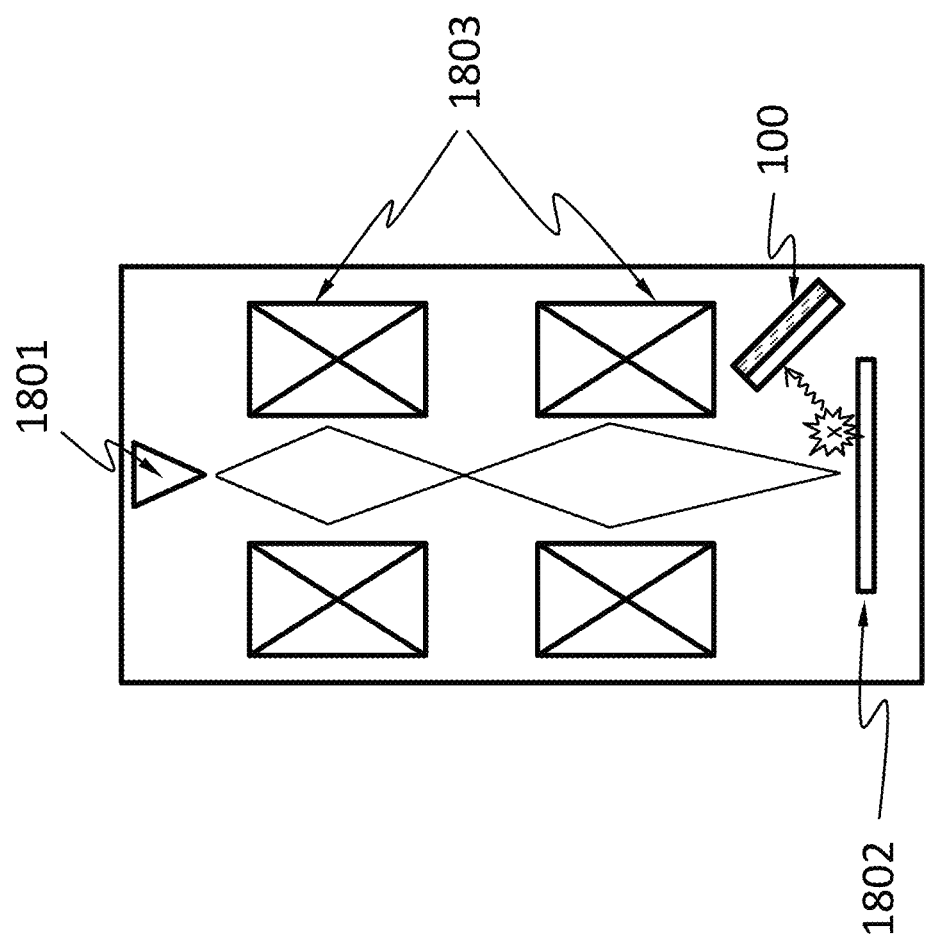
FIG. 15 schematically shows an electron microscope comprising the radiation detector described herein, according to an embodiment.

FIG. 15 schematically shows an electron microscope. The electron microscope comprises an electron source 1801 (also called an electron gun) that is configured to emit electrons. The electron source 1801 may have various emission mechanisms such as thermionic, photocathode, cold emission, or plasmas source. The emitted electrons pass through an electronic optical system 1803, which may be configured to shape, accelerate, or focus the electrons. The electrons then reach a sample 1802 and an image detector may form an image therefrom. The electron microscope may comprise the radiation detector 100 described herein, for performing energy-dispersive X-ray spectroscopy (EDS). EDS is an analytical technique used for the elemental analysis or chemical characterization of a sample. When the electrons incident on a sample, they cause emission of characteristic X-rays from the sample. The incident electrons may excite an electron in an inner shell of an atom in the sample, ejecting it from the shell while creating an electron hole where the electron was. An electron from an outer, higher-energy shell then fills the hole, and the difference in energy between the higher-energy shell and the lower energy shell may be released in the form of an X-ray. The number and energy of the X-rays emitted from the sample can be measured by the radiation detector 100.

The radiation detector 100 described here may have other applications such as in a radiation telescope, radiation mammography, industrial radiation defect detection, radiation microscopy or microradiography, radiation casting inspection, radiation non-destructive testing, radiation weld inspection, radiation digital subtraction angiography, etc. It may be suitable to use this radiation detector 100 in place of a photographic plate, a photographic film, a PSP plate, a radiation image intensifier, a scintillator, or another semiconductor radiation detector.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus suitable for detecting radiation, comprising:
    a plurality of pixels configured to generate an electric signal upon exposure to a radiation;
    an electronic system configured to read out the electric signal;
    wherein the electronic system comprises a first memory and a second memory;
    wherein the first memory is configured to store a plurality of data bits representing the electric signal generated by the pixel that the first memory is associated with;
    wherein the electronic system is configured to transmit a subset of bits among the plurality of data bits, from the first memory to the second memory;
    wherein the electronic system is configured to transmit the subset of bits from the second memory to a bus;
    wherein the electronic system is configured to verify the subset of bits transmitted to the second memory against contents of the first memory, configured to verify the subset of bits transmitted to the bus against contents of the second memory, or configured to verify the subset of bits transmitted to the second memory against the contents of the first memory and verify the subset of bits transmitted to the bus against the contents of the second memory.

2. The apparatus of claim 1, wherein a bit width of the second memory is less than a bit width of the first memory.

3. The apparatus of claim 1, wherein a bit width of the subset of bits is equal to or less than a bit width of the second memory.

4. The apparatus of claim 1, wherein the electronic system is configured to transmit the subset of bits by shifting bit by bit the data bits from the first memory, to the second memory, then to the bus.

5. The apparatus of claim 1, wherein the electronic system is configured to transmit all bits of the subset of bits at the same time from the first memory, to the second memory, then to the bus.

6. The apparatus of claim 1, wherein the electronic system is configured to transmit the subset of bits without changing a sequential order of the subset of bits.

7. The apparatus of claim 1, wherein the electronic system is configured to transmit the subset of bits by reversing a sequential order of the subset of bits.

8. The apparatus of claim 1, wherein the subset of bits are most significant bits (MSBs) among the plurality of the data bits.

9. The apparatus of claim 8, wherein the electronic system is configured to shift least significant bits (LSBs) among the plurality of data bits into positions of the subset of bits.

10. The apparatus of claim 9, wherein the electronic system is configured to shift most significant bits (MSBs) among the plurality of the data bits into positions of the subset of bits.

11. The apparatus of claim 1, wherein the subset of bits are least significant bits (LSBs) among the plurality of the data bits.

12. The apparatus of claim 1, wherein the electronic system is configured to retransmit the subset of bits from the first memory to the second memory when verification of the subset of bits fails.

13. The apparatus of claim 1, wherein the electronic system is configured to erase the subset of bits from the first memory when verification of the subset of bits succeeds.

14. The apparatus of claim 1, wherein the electronic system is configured to retransmit the subset of bits from the second memory to the bus when verification of the subset of bits fails.

15. The apparatus of claim 1, wherein the electronic system is configured to erase the subset of bits from the second memory when verification of the subset of bits succeeds.

16. The apparatus of claim 1, wherein each of the pixels comprises a radiation absorption layer with an electrode;
    wherein the electronic system further comprises:
        a first voltage comparator configured to compare a voltage on the electrode to a first threshold;

a second voltage comparator configured to compare the voltage to a second threshold;
a counter configured to register a number of radiation particles absorbed by the radiation absorption layer, the electric signal being the number;
a controller;
wherein the controller is configured to start a time delay from a time at which the first voltage comparator determines that an absolute value of the voltage equals or exceeds an absolute value of the first threshold;
wherein the controller is configured to activate the second voltage comparator during the time delay;
wherein the controller is configured to cause the number registered by the counter to increase by one, if the second voltage comparator determines that an absolute value of the voltage equals or exceeds an absolute value of the second threshold.

17. The apparatus of claim 16, wherein the electronic system further comprises a capacitor module electrically connected to the electrode, wherein the capacitor module is configured to collect charge carriers from the electrode.

18. The apparatus of claim 16, wherein the controller is configured to connect the electrode to an electrical ground.

19. The apparatus of claim 16, wherein the controller is configured to deactivate the first voltage comparator or the second voltage comparator at a beginning of the time delay.

20. The apparatus of claim 16, wherein the first threshold is 5-11% of a voltage a single radiation particle generates on the electrode.

21. The apparatus of claim 16, wherein the radiation absorption layer comprises a diode.

22. The apparatus of claim 16, wherein the radiation absorption layer comprises silicon, germanium, GaAs, CdTe, CdZnTe, or a combination thereof.

23. The apparatus of claim 16, wherein the apparatus does not comprise a scintillator.

24. A system comprising the apparatus of claim 1 and a radiation source.

25. A method comprising:
transmitting a subset of bits among a plurality of data bits stored in a first memory of an electronic system of an apparatus suitable for detecting radiation, from the first memory to a second memory of the electronic system, wherein the plurality of data bits represent an electrical signal generated by a pixel of the apparatus upon exposure to the radiation;
transmitting the subset of bits from the second memory to a bus;
verifying the subset of bits transmitted to the second memory against contents of the first memory, verifying the subset of bits transmitted to the bus against contents of the second memory, or verifying the subset of bits transmitted to the second memory against the contents of the first memory and the subset of bits transmitted to the bus against the contents of the second memory.

26. The method of claim 25, wherein a bit width of the second memory is less than a bit width of the first memory.

27. The method of claim 25, wherein a bit width of the subset of bits is equal to or less than a bit width of the second memory.

28. The method of claim 25, wherein transmitting the subset of bits from the first memory to the second memory comprises shifting the subset of bits bit by bit.

29. The method of claim 25, wherein transmitting the subset of bits from the first memory to the second memory comprises shifting all bits of the subset of bits at the same time.

30. The method of claim 25, wherein the subset of bits are most significant bits (MSBs) among the plurality of the data bits.

31. The method of claim 25, wherein the subset of bits are least significant bits (LSBs) among the plurality of the data bits.

32. The method of claim 25, further comprising retransmitting the subset of bits from the first memory to the second memory when verification of the subset of bits fails.

33. The method of claim 25, further comprising retransmitting the subset of bits from the second memory to the bus when verification of the subset of bits fails.

34. The method of claim 25, further comprising repeating transmission of the subset of bits until the plurality of all data bits stored in the first memory are transmitted to the bus.

35. An apparatus suitable for detecting radiation, comprising:
a plurality of pixels configured to generate an electric signal upon exposure to a radiation;
an electronic system configured to read out the electric signal;
wherein the electronic system comprises a first memory and a second memory;
wherein the first memory is configured to store a plurality of data bits representing the electric signal generated by the pixel that the first memory is associated with;
wherein the electronic system is configured to transmit a subset of bits among the plurality of data bits, from the first memory to the second memory;
wherein the electronic system is configured to transmit the subset of bits from the second memory to a bus;
wherein each of the pixels comprises a radiation absorption layer with an electrode;
wherein the electronic system further comprises:
a first voltage comparator configured to compare a voltage on the electrode to a first threshold;
a second voltage comparator configured to compare the voltage to a second threshold;
a counter configured to register a number of radiation particles absorbed by the radiation absorption layer, the electric signal being the number;
a controller;
wherein the controller is configured to start a time delay from a time at which the first voltage comparator determines that an absolute value of the voltage equals or exceeds an absolute value of the first threshold;
wherein the controller is configured to activate the second voltage comparator during the time delay;
wherein the controller is configured to cause the number registered by the counter to increase by one, if the second voltage comparator determines that an absolute value of the voltage equals or exceeds an absolute value of the second threshold.

36. The apparatus of claim 35, wherein the electronic system further comprises a capacitor module electrically connected to the electrode, wherein the capacitor module is configured to collect charge carriers from the electrode.

37. The apparatus of claim 35, wherein the controller is configured to deactivate the first voltage comparator or the second voltage comparator at a beginning of the time delay.

38. The apparatus of claim 35, wherein the first threshold is 5-11% of a voltage a single radiation particle generates on the electrode.

39. The apparatus of claim 35, wherein the radiation absorption layer comprises a diode.

40. The apparatus of claim 35, wherein the apparatus does not comprise a scintillator.

* * * * *